United States Patent
Leppinen

(10) Patent No.: US 7,136,930 B1
(45) Date of Patent: Nov. 14, 2006

(54) SYSTEM AND METHOD FOR EFFECTIVE USE OF AIR LINK BETWEEN MOBILE STATIONS AND GATEWAY SERVERS

(75) Inventor: Mika Leppinen, Woburn, MA (US)

(73) Assignee: Nokia Corporation, Espoo (FI)

( * ) Notice: Subject to any disclaimer, the term of this patent is extended or adjusted under 35 U.S.C. 154(b) by 399 days.

(21) Appl. No.: 09/435,602

(22) Filed: Nov. 5, 1999

(51) Int. Cl.
G06F 15/16 (2006.01)
G06F 15/173 (2006.01)

(52) U.S. Cl. .................. 709/238; 709/218; 709/219; 709/227; 709/245

(58) Field of Classification Search ............... 709/238, 709/219, 239, 217, 218, 225, 227, 228, 229, 709/245
See application file for complete search history.

(56) References Cited

U.S. PATENT DOCUMENTS

| | | | |
|---|---|---|---|
| 5,293,379 A | 3/1994 | Carr | 370/94.1 |
| 5,649,186 A * | 7/1997 | Ferguson | 395/610 |
| 5,812,769 A * | 9/1998 | Graber et al. | 709/228 |
| 5,812,784 A * | 9/1998 | Watson et al. | 709/205 |
| 5,870,546 A * | 2/1999 | Kirsch | 709/205 |
| 5,873,076 A * | 2/1999 | Barr et al. | 707/3 |
| 5,892,919 A | 4/1999 | Nielsen | 395/200.58 |
| 5,966,652 A | 10/1999 | Coad et al. | 455/412 |
| 5,974,447 A * | 10/1999 | Cannon et al. | 709/206 |
| 6,088,594 A | 7/2000 | Kingdon et al. | 455/457 |
| 6,112,099 A | 8/2000 | Ketola | 455/466 |
| 6,115,754 A * | 9/2000 | Landgren | 709/249 |
| 6,122,661 A * | 9/2000 | Stedman et al. | 709/217 |
| 6,138,162 A * | 10/2000 | Pistriotto et al. | 709/229 |
| 6,185,598 B1 * | 2/2001 | Farber et al. | 709/200 |
| 6,226,752 B1 * | 5/2001 | Gupta et al. | 713/201 |
| 6,247,054 B1 * | 6/2001 | Malkin | 709/225 |
| 6,292,833 B1 * | 9/2001 | Liao et al. | 709/229 |
| 6,314,108 B1 * | 11/2001 | Ramasubramani et al. | 370/465 |
| 6,334,056 B1 * | 12/2001 | Holmes et al. | 455/445 |
| 6,334,152 B1 * | 12/2001 | Mannings et al. | 709/227 |
| 6,343,323 B1 * | 1/2002 | Kalpio et al. | 709/229 |

(Continued)

FOREIGN PATENT DOCUMENTS

EP 0 811 939 A2 12/1999

(Continued)

OTHER PUBLICATIONS

"WAP Architecture" WAP Architecture Version 30 Apr. 1998, XX, XX, Apr. 26, 1999, pp. 1-20, XP002101098, pp. 12, line 4—p. 13, line 17 figures 2, 3.*

(Continued)

Primary Examiner—Jason Cardone
Assistant Examiner—Melvin H. Pollack
(74) Attorney, Agent, or Firm—Cohen, Pontani, Lieberman & Pavane

(57) ABSTRACT

A method and system for minimizing data transmission between a mobile station and a gateway server. The method provides that a mobile station transmits to a gateway server a request for a content and/or a resource located on a web server using a first protocol. The gateway server then transmits the request to the web server using a second protocol that is compatible with that used by the web server. The gateway server receives a redirection message from the web server indicating a new location of the content and/or resource. In response to the redirection message, the gateway server creates and transmits another request for the content and/or resource at the new location. After receiving the requested content and/or resource from the web server or another web server, the gateway server transmits the requested content and/or resource to the mobile station using the first protocol.

12 Claims, 3 Drawing Sheets

U.S. PATENT DOCUMENTS

| | | | |
|---|---|---|---|
| 6,356,934 B1* | 3/2002 | Delph | 709/204 |
| 6,359,880 B1* | 3/2002 | Curry et al. | 370/352 |
| 6,363,419 B1* | 3/2002 | Martin et al. | 709/219 |
| 6,389,462 B1* | 5/2002 | Cohen et al. | 709/218 |
| 6,393,014 B1* | 5/2002 | Daly et al. | 370/352 |
| 6,393,482 B1* | 5/2002 | Rai et al. | 709/225 |
| 6,424,828 B1* | 7/2002 | Collins et al. | 455/412.1 |
| 6,457,030 B1* | 9/2002 | Adams et al. | 707/523 |
| 6,457,060 B1* | 9/2002 | Martin et al. | 709/245 |
| 6,460,081 B1* | 10/2002 | Doherty et al. | 709/225 |
| 6,466,783 B1* | 10/2002 | Dahm et al. | 455/414 |
| 6,477,565 B1* | 11/2002 | Daswani et al. | 709/217 |
| 6,480,853 B1* | 11/2002 | Jain | 707/10 |
| 6,505,241 B1* | 1/2003 | Pitts | 709/218 |
| 6,560,640 B1* | 5/2003 | Smethers | 709/219 |
| 6,615,131 B1* | 9/2003 | Rennard et al. | 701/200 |

FOREIGN PATENT DOCUMENTS

| | | |
|---|---|---|
| WO | WO 97/48212 | 12/1997 |
| WO | WO 99/40514 | 8/1999 |

OTHER PUBLICATIONS

Hoffpauir et al. (H1, 895), Oct. 2000, 455/433. US Statutory Invention Registration. "Application Provider and Method for Communication".*

"WAP Architecture" WAP Architecture Version 30 Apr. 1998, XX, XX, Apr. 26, 1999, pp. 1-20, XP002101098.*

Jens Michael, "WebOnAir Macht Dem Mobilen Internet Beine", vol. 52, No. 8, 1999, pp. 45-46.*

Berners Lee T: "Hypertext Transfer Protocal—HTTP/1.1 RFC 2616" IETF Network Working Group, Jun. 1999, XP002159137 p. 40, Line 4—p. 42, line 14.

Java Virtual Machine Byte Code Emulation, XP-000888634, Disclosed by International Business Machines Corporation.

* cited by examiner

SYSTEM AND METHOD FOR EFFECTIVE USE OF AIR LINK BETWEEN MOBILE STATIONS AND GATEWAY SERVERS

BACKGROUND OF THE INVENTION

1. Field of the Invention

The present invention relates to wireless communication systems and more particularly, to a system and method of processing mobile station requests for contents stored on a web server in a wireless communication network.

2. Description of the Related Art

Remote communication with individuals has become increasingly important in a mobile society. Early versions of wireless devices transmitted a signal to a paging device worn by the user. The paging device did little more than provide a beep indicating that a message had been sent to the user. The user must then call a telephone number to receive the actual message. These early paging devices were replaced with text messaging devices that include a small display that permits the transmission of a text message, such as the message sender's telephone number. While the text messaging device provided additional data to the user, the user still had to use a separate telephone to contact the message sender, or to take action in accordance with the message.

With the advent of wireless communications networks, a user can simply call any telephone number on his cellular phone from virtually anywhere and once connected, speak directly to another party. Some cellular "phones" are even capable of transmitting and receiving data through an air link. These "phones," more properly named as mobile stations, operate as mobile terminals have features similar to those of desktop computer terminals, features such as, for example, the ability to access stock quotes, weather, and e-mail messages through the Internet. Typical mobile stations, however, have less powerful processors and memories than those of desktop terminals because they have severe size and power consumption constraints. The amount of data and the reliability of data transmission are also limited by the available spectrum, i.e., the radio resources allotted to the mobile station.

Prior art systems require the terminals including mobile stations to perform a variety of tasks while communicating with a web (or origin) server, much like the desktop terminals. Such tasks include processing of redirection messages from web servers, i.e., messages redirecting the "user agents" (e.g., web browsers) of the mobile stations to new locations to which the requested resources or contents have been moved. The location of a content or a resource on the Internet is identified by what is known as Uniform Resource Locator (URL), a global address of documents and resources on the World Wide Web. A URL has two parts, the first part specifying the protocol or scheme (e.g. HyperText Transfer Protocol (HTTP) or File Transfer Protocol (FTP)) used for fetching the content and the second part specifies the address or location of the content. Thus, for example, when a mobile station accesses a content that has been moved, the web server sends an HTTP redirection message to a gateway server indicating the new location of the requested content. The gateway server then sends a message encoded according to the Wireless Application Protocol to the mobile station through the wireless portion of the network. Once the mobile station receives the redirection message, its web browser automatically sends a new WAP encoded request to the gateway server which decodes the request and generates a new URL request identifying the new location.

These tasks, however, waste valuable radio resources in the wireless network. There is accordingly a need for a system and method that minimizes usage of radio resources while a mobile station is communicating with a web server.

SUMMARY OF THE INVENTION

An object of the invention is to provide a method and a system for optimizing data transmission to a mobile station when the mobile station communicates with a web or origin server.

According to an aspect of the invention, tasks associated with redirection messages from a web server are handled by a gateway server so as to minimize usage of radio resources in a wireless communication network. The processing of redirection messages by the gateway server is transparent to the mobile station so that the mobile station receives the requested content or resource without sending another request to a web server, even though the requested content or resource has been moved to a different location (at the same web server or another web server). When the requested content or resource has been successfully downloaded, the mobile station stores the new location in its history file.

In one embodiment of the invention, a mobile station transmits to a gateway server a request for a content and/or a resource located on a web server using a first protocol. The gateway server then transmits the request to the web server using a second protocol that is compatible with that used by the web server. The gateway server receives a redirection message from the web server indicating a new location of the requested content and/or resource. In response to the redirection message, the gateway server creates and transmits another request for the content and/or resource at the new location. After receiving the requested content and/or resource from the same web server or another web server, the gateway server transmits the requested content and/or resource to the mobile station using the first protocol.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
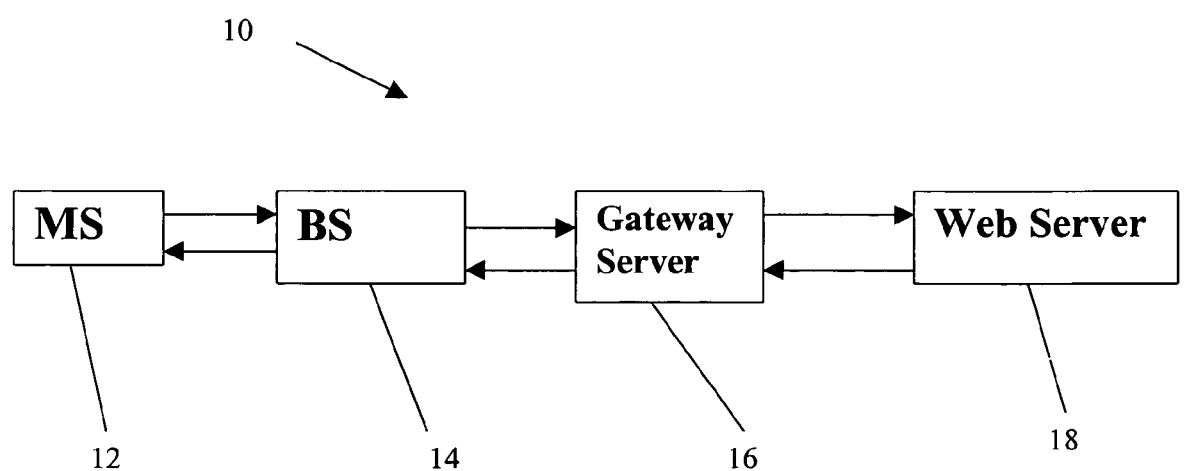
FIG. 1 is a block diagram illustrating a system configured to operate in accordance with an embodiment of the invention.

FIG. 1 illustrates a system 10 configured in accordance with one embodiment of the invention. The system includes a mobile station (MS) 12, a base station (BS) 14, a gateway server 16, and an origin or web server 18. The MS 12 (e.g., a cellular phone with a video display such as a liquid crystal display, a handheld or laptop computer with communication capabilities, etc.) preferably includes a Wireless Application Protocol (WAP) user agent configured for communicating with the web server 18 through the gateway server 16. The user agent may, for example, be a micro web browser having features that are similar to a conventional web browser employed by a desktop computer terminal but requires far less computer memory and/or processing power. The BS 14 includes a base transceiver station (not shown) for relaying messages through an air-link between the MS 12 and the gateway server 16. The system 10 may also include a mobile switching center (not shown) for routing and monitoring messages between the BS 14 and the gateway server 16.

The gateway server 16 decodes requests received from the MS 12 and encodes the requests based on World Wide Web communication protocols such as, for example, the HyperText Transfer Protocol (HTTP). The encoded requests are then sent to the appropriate web servers for accessing contents and/or resources stored thereat. HTTP is a commonly used protocol on the Internet; it is a stateless protocol as each command is executed independently, i.e., without any knowledge of previous HTTP commands.

The locations of the contents and/or resources at the web server 18 or another web server are uniquely identified by Uniform Resource Locators (URLs) and accessible by the mobile station 12, if authorized. As defined herein, the term "content" includes data stored or generated by a web server and typically displayed or interpreted by a user agent (e.g., a web browser); and the term "resource" includes routines (e.g. executable files), network data objects or services. Thus, a user, using an appropriate user agent, can access and retrieve contents and resources from a web server by simply specifying an appropriate URL. If, however, the user-specified URL for the requested content or resource has been moved to a new location, the web server 18 sends out a redirection message concerning the new location of the requested contents or resources. The new location may be referenced relative to a location specified in the original or a subsequent request, or may also be a complete URL containing a full path of the requested content or resource without referencing a location specified by a previous URL request.

Advantageously, the gateway server 18 is configured to send out new URL requests, on behalf of the MS 12, in response to the redirection message from the web server 18. Once the gateway server 16 receives the desired content or resource, the information is encoded and transmitted to the MS 12 together with the new location of the resource or content.

Figure 2A:
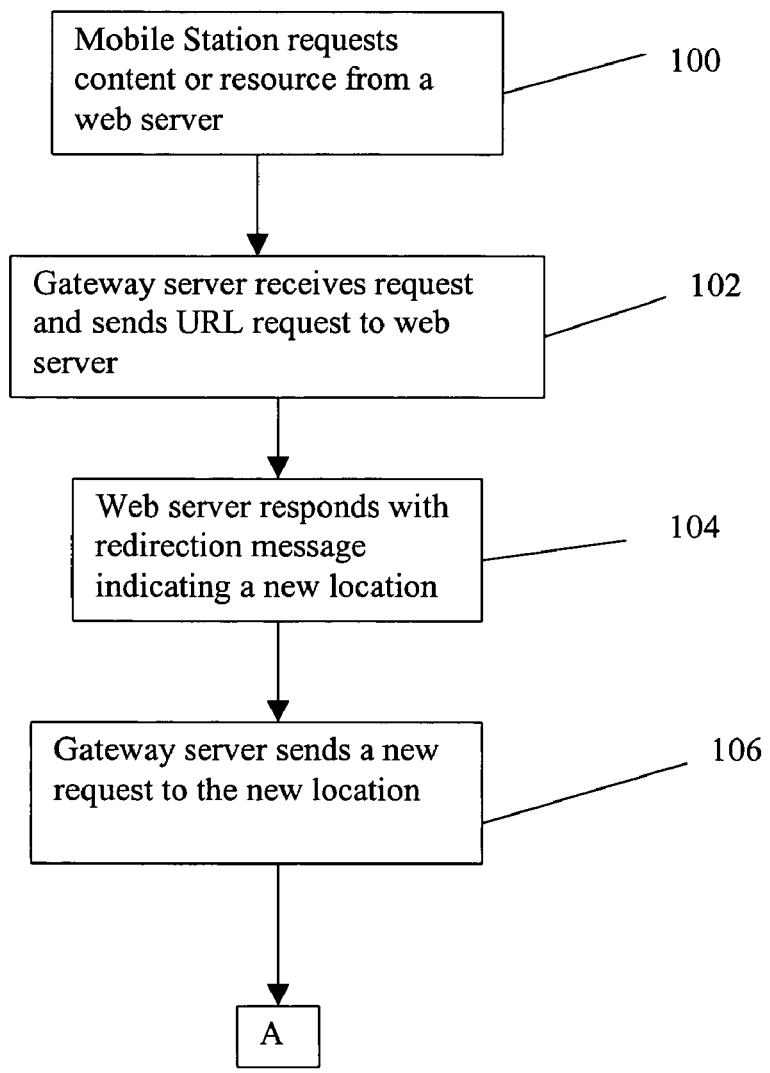
FIGS. 2A and 2B are a flowchart describing the inventive steps performed by the embodiment of FIG. 1.
Figure 2B:
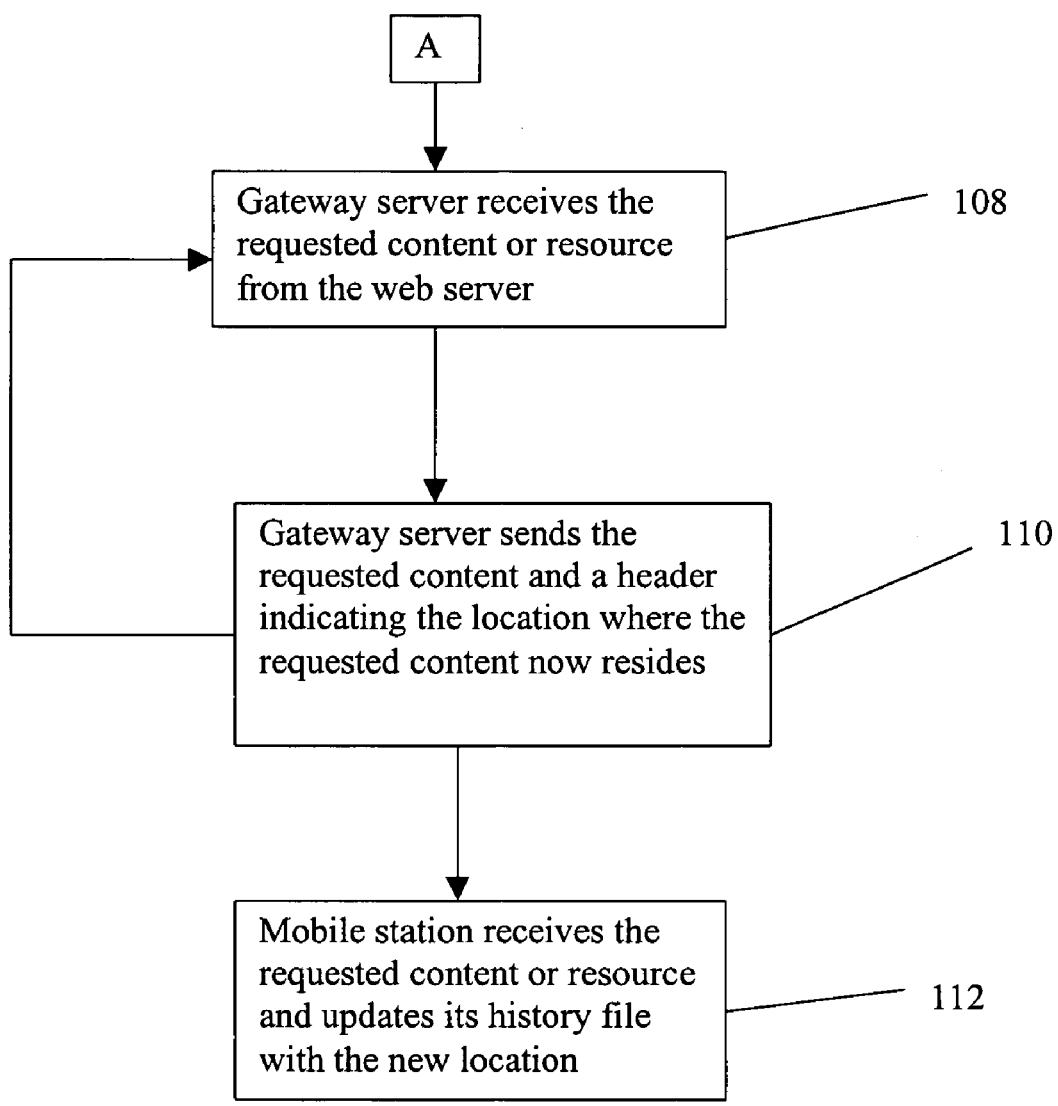

FIGS. 2A and 2B are a flow diagram illustrating the steps to be performed by the preferred embodiment of the present invention. In step 100, the MS 12 sends a message, preferably coded using WAP, requesting a content or resource from the web server 18 through the gateway server 16. In step 102, the gateway server 16 transforms the request into a URL request using, for example, the HTTP scheme, and sends the message out to the web server 18. In step 104, the web server 18 responds with an HTTP redirection message indicating the new location of the requested content or resource. In step 106, the gateway server 16 makes a new HTTP URL request containing the new URL in accordance with the redirection message. The new HTTP URL request may be directed to the same web server 18 or to another web server. Steps 110 and 112 may be repeated until the gateway server 16 receives the requested content or resource as indicated in step 108. In step 110, the gateway server 16 sends the requested content or resource, preferably coded using WAP, together with its new location (i.e., the new URL for the requested content) in the form of, for example, a header to the MS 12. In step 112, the MS 12 receives the requested content or resource and updates its history file with the new URL.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for minimizing data transmission between a mobile station and a gateway server, comprising the steps of:
    (a) transmitting by a mobile station to a gateway server a request for at least one of content and resource located on a web server using a first protocol;
    (b) transmitting the request by the gateway server to the web server using a second protocol that is compatible with that used by the web server;
    (c) receiving a redirection message by the gateway server from the web server, the redirection message indicating a new location of the at least one of content and resource;
    (d) creating and transmitting by the gateway server to one of the web server and another web server another request for the at least one of content and resource at the new location in response to the redirection message and without communicating the redirection message to the mobile station;
    (e) receiving by the gateway server the at least one of content and resource from said one of the web server and another web server; and
    (f) transmitting the at least one of content and resource from the gateway server to the mobile station using the first protocol.

2. The method of claim 1, further comprising the step (g) of transmitting the new location of the at least one of content and resource to the mobile station from the gateway server after said step (e).

3. The method of claim 2, wherein the new location is included as a header transmitted with the at least one of content and resource.

4. The method of claim 1, wherein the first protocol of step (a) is based on the Wireless Application Protocol.

5. The method of claim 1, wherein the second protocol of step (b) is based on a World-Wide Web protocol.

6. The method of claim 5, wherein the second protocol is the HyperText Transport Protocol.

7. The method of claim 1, wherein the request is coded as a Uniform Resource Locator.

8. A system for minimizing data transmission between a mobile station and a gateway server, comprising:
    a mobile station for transmitting a request for one of content and resource at a location using a first protocol;

a gateway server, connected to said mobile station, for receiving the request from said mobile station using the first protocol and for encoding and transmitting the request using a second protocol; and a web server connected to said gateway server for storing at least one of content and resource, said web server receiving the encoded request from said gateway server and sending a redirection message to said gateway server indicating a new location of the requested one of content or resource, said gateway server receiving the redirection message and sending a request to the new location without communicating the redirection message to said mobile station, said gateway server accessing the requested one of content and resource from one of said web server and another web server in accordance with the new location and transmitting to said mobile receiver the requested one of content and resource.

9. The system of claim 8, wherein the request from said gateway server is a Uniform Resource Locator.

10. The system of claim 8, wherein the first protocol is the Wireless Application Protocol and the second protocol is the HyperText Transfer Protocol.

11. The system of claim 8, wherein said gateway server is configured to send the new location to said mobile station together with the requested one of content and resource.

12. The system of claim 8, wherein said web server includes the requested one of content and resource at the new location.

* * * * *